United States Patent
Laing et al.

(10) Patent No.: US 9,410,451 B2
(45) Date of Patent: Aug. 9, 2016

(54) GAS TURBINE ENGINE WITH INTEGRATED BOTTOMING CYCLE SYSTEM

(71) Applicant: General Electric Company, Schenectady, NY (US)

(72) Inventors: Donald Gordon Laing, Houston, TX (US); Charles Michael Booth, Norcross, GA (US)

(73) Assignee: General Electric Company, Schenectady, NY (US)

( * ) Notice: Subject to any disclaimer, the term of this patent is extended or adjusted under 35 U.S.C. 154(b) by 597 days.

(21) Appl. No.: 13/693,113

(22) Filed: Dec. 4, 2012

(65) Prior Publication Data

US 2014/0150443 A1  Jun. 5, 2014

(51) Int. Cl.
*F01K 23/10* (2006.01)

(52) U.S. Cl.
CPC .............. *F01K 23/10* (2013.01); *F01K 23/103* (2013.01); *Y02E 20/16* (2013.01)

(58) Field of Classification Search
CPC ......... F01K 23/10; F01K 23/103; F02C 7/18; F02C 7/224; F02C 7/047; F02C 7/08; F01D 25/02; B64D 15/00; B64D 25/02; B64D 2033/0233; Y02T 10/166; Y02E 20/16; F25B 11/00; F25B 2309/061

See application file for complete search history.

(56) References Cited

U.S. PATENT DOCUMENTS

| | | | |
|---|---|---|---|
| 3,400,555 A * | 9/1968 | Granryd | F02G 1/043 62/115 |
| 3,788,066 A * | 1/1974 | Nebgen | F01K 17/06 60/39.55 |
| 3,934,553 A * | 1/1976 | Freeman et al. | 122/7 B |
| 4,205,532 A * | 6/1980 | Brenan | F25B 1/00 62/114 |
| 4,235,079 A * | 11/1980 | Masser | F25B 27/00 62/116 |
| 4,358,930 A | 11/1982 | Pope et al. | |
| 4,573,321 A | 3/1986 | Knaebel | |
| 4,785,622 A * | 11/1988 | Plumley | F01K 21/042 60/39.12 |
| 5,317,904 A | 6/1994 | Bronicki | |
| 5,745,481 A * | 4/1998 | Phillips | H04W 84/022 370/313 |
| 5,799,490 A | 9/1998 | Bronicki et al. | |
| 6,253,554 B1 * | 7/2001 | Kobayashi | F02C 7/12 60/736 |
| 7,340,897 B2 | 3/2008 | Zimron et al. | |

(Continued)

FOREIGN PATENT DOCUMENTS

| | | |
|---|---|---|
| EP | 1179664 A2 | 2/2002 |
| EP | 2351915 A1 | 8/2011 |

OTHER PUBLICATIONS

GB Search and Examination Report issued Jun. 19, 2014 in connection with corresponding GB Patent Application No. GB1320541.4.

(Continued)

*Primary Examiner* — Carlos A Rivera
(74) *Attorney, Agent, or Firm* — Sutherland Asbill & Brennan LLP

(57) ABSTRACT

The present application provides an integrated bottoming cycle system for use with a gas turbine engine. The integrated bottoming cycle system described herein may include a compressor/pump, a cooling circuit downstream of the compressor/pump, a bottoming cycle heat exchanger, a heating circuit downstream of the bottoming cycle heat exchanger, and a number of turbine components in communication with the cooling circuit and/or the heating circuit to maximize the overall plant efficiency and economics.

15 Claims, 2 Drawing Sheets

(56) References Cited

U.S. PATENT DOCUMENTS

| | | | |
|---|---|---|---|
| 8,096,128 B2 | 1/2012 | Held et al. | |
| 2004/0003592 A1 | 1/2004 | Viteri et al. | |
| 2006/0260290 A1* | 11/2006 | Rao | F01K 11/02 60/39.53 |
| 2006/0272334 A1* | 12/2006 | Pranda | F01K 23/103 60/783 |
| 2007/0163261 A1 | 7/2007 | Strathman | |
| 2007/0240400 A1* | 10/2007 | Smith | F01K 23/101 60/39.182 |
| 2009/0229271 A1* | 9/2009 | De Ruyck | F01K 23/10 60/775 |
| 2009/0282836 A1* | 11/2009 | Mak | 60/783 |
| 2010/0054926 A1* | 3/2010 | Zhang | F02C 7/10 415/178 |
| 2010/0146930 A1* | 6/2010 | Motakef | F01K 23/10 60/39.182 |
| 2010/0146981 A1* | 6/2010 | Motakef | F01K 27/02 60/772 |
| 2010/0156112 A1 | 6/2010 | Held et al. | |
| 2010/0242492 A1* | 9/2010 | Sloat | F02C 7/12 60/793 |
| 2011/0005244 A1* | 1/2011 | Finney | B64D 13/08 62/87 |
| 2011/0061384 A1 | 3/2011 | Held et al. | |
| 2011/0079017 A1* | 4/2011 | Gulen | F01K 23/10 60/783 |
| 2011/0113780 A1 | 5/2011 | Lehar | |
| 2012/0011871 A1* | 1/2012 | Czechowski | 62/238.3 |
| 2012/0047892 A1* | 3/2012 | Held | F01K 3/185 60/652 |
| 2012/0067055 A1* | 3/2012 | Held | 60/772 |
| 2012/0067057 A1* | 3/2012 | Hofmann | F01K 23/10 60/775 |
| 2012/0128463 A1* | 5/2012 | Held | 415/1 |
| 2012/0131920 A1 | 5/2012 | Held et al. | |
| 2012/0131921 A1 | 5/2012 | Held | |
| 2012/0159956 A1* | 6/2012 | Gurin | F01K 23/06 60/767 |
| 2012/0174558 A1* | 7/2012 | Gurin | F01K 23/06 60/39.63 |
| 2012/0174583 A1 | 7/2012 | Lehar | |
| 2013/0111913 A1* | 5/2013 | Hamrin et al. | 60/772 |
| 2013/0239542 A1* | 9/2013 | Dasgupta | F02C 7/143 60/39.093 |
| 2014/0102113 A1* | 4/2014 | Cuevas | F02C 7/047 60/736 |

OTHER PUBLICATIONS

Matthew Pastell, et al.; "Closed Brayton Cycle Waste Fuel Power Cogeneration System"; Proceeding of the Intersociety Energy Conversion engineering Conference, vol. 1, pp. 274-279, Date: 1985.

\* cited by examiner

GAS TURBINE ENGINE WITH INTEGRATED BOTTOMING CYCLE SYSTEM

TECHNICAL FIELD

The present application and the resultant patent relate generally to gas turbine engines and more particularly relate to a gas turbine engine with an integrated supercritical carbon dioxide bottoming cycle system for electric power production and efficient heating and cooling of any number of different turbine components.

BACKGROUND OF THE INVENTION

The overall efficiency of a power plant improves with the effective use of the waste heat produced therein. The term "waste heat" generally may encompass any supply of residual heat produced by a primary process that is not conventionally exploited as a source of energy. One method of using the waste heat produced by a combustion engine is to apply a bottoming Rankine cycle so as to generate electricity. Steam-based Rankine cycle systems, however, may be relatively costly and inefficient, particularly when operating on low temperature waste heat. Similarly, the performance of an organic Rankine cycle system may be limited by the nature of the working fluid therein.

There is thus a desire for an improved bottoming cycle system for use with a gas turbine engine. Preferably such an improved bottoming cycle system may provide multiple functions and advantages in an integrated system that efficiently uses the waste heat of a gas turbine.

SUMMARY OF THE INVENTION

The present application and the resultant patent thus provide an integrated bottoming cycle system for use with a gas turbine engine. The integrated bottoming cycle system described herein may include a compressor/pump, a cooling circuit downstream of the compressor/pump, a bottoming cycle heat exchanger, a heating circuit downstream of the bottoming cycle heat exchanger, and a number of turbine components in communication with the cooling circuit and/or the heating circuit.

The present application and the resultant patent further provide a method of operating an integrated bottoming cycle system. The method may include the steps of compressing/pressurizing a flow of carbon dioxide, warming the flow of carbon dioxide, expanding the flow of carbon dioxide, driving a load by the expanding flow of carbon dioxide, and diverting a portion of the compressed flow to cool a turbine component or diverting a portion of the warmed flow to heat a turbine component.

The present application and the resultant patent further provide an integrated bottoming cycle system for use with a gas turbine engine. The integrated bottoming cycle system may include a carbon dioxide compressor/pump for compressing/pumping a flow of supercritical carbon dioxide, a cooling circuit downstream of the compressor/pump, a bottoming cycle heat exchanger for exchanging heat with the gas turbine engine, a heating circuit downstream of the bottoming cycle heat exchanger, and a number of turbine components in communication with the cooling circuit and/or the heating circuit herein.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
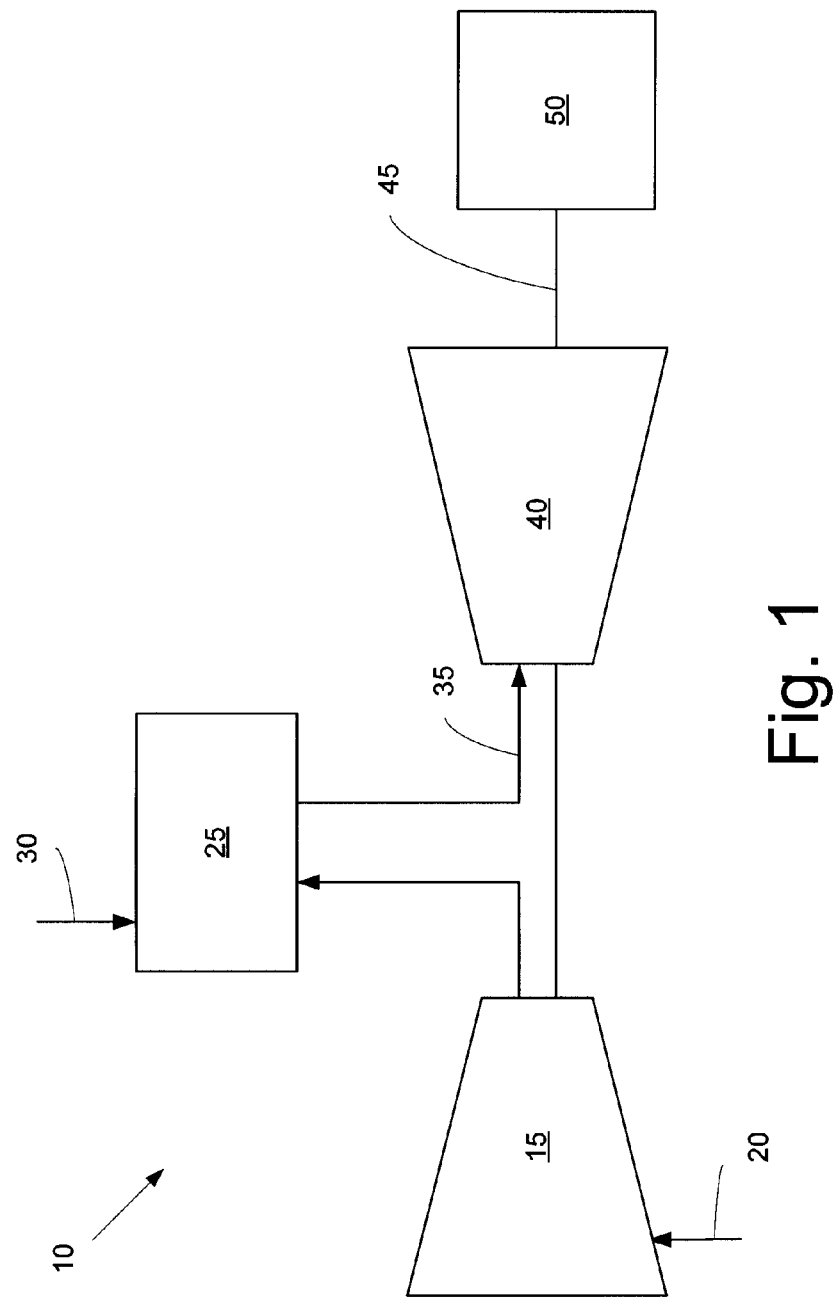
FIG. 1 is a schematic diagram of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. A flow of hot exhaust gases 55 exits the turbine for further use. Moreover, multi-shaft gas turbine engines 10 and the like also may be used herein. In such a configuration, the turbine 40 may be split into a high pressure section that drives the compressor 15 and a low pressure section that drives the load 50. Other configurations may be used herein.

The gas turbine engine 10 may use natural gas, liquid fuels, various types of syngas, and/or other types of fuels. The gas turbine engine 10 may be any one of a number of different gas turbine engines offered by General Electric Company of Schenectady, N.Y., including, but not limited to, those such as the LM2500, LM6000 aero-derivative gas turbines, 7 or a 9 series heavy duty gas turbine engines, and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
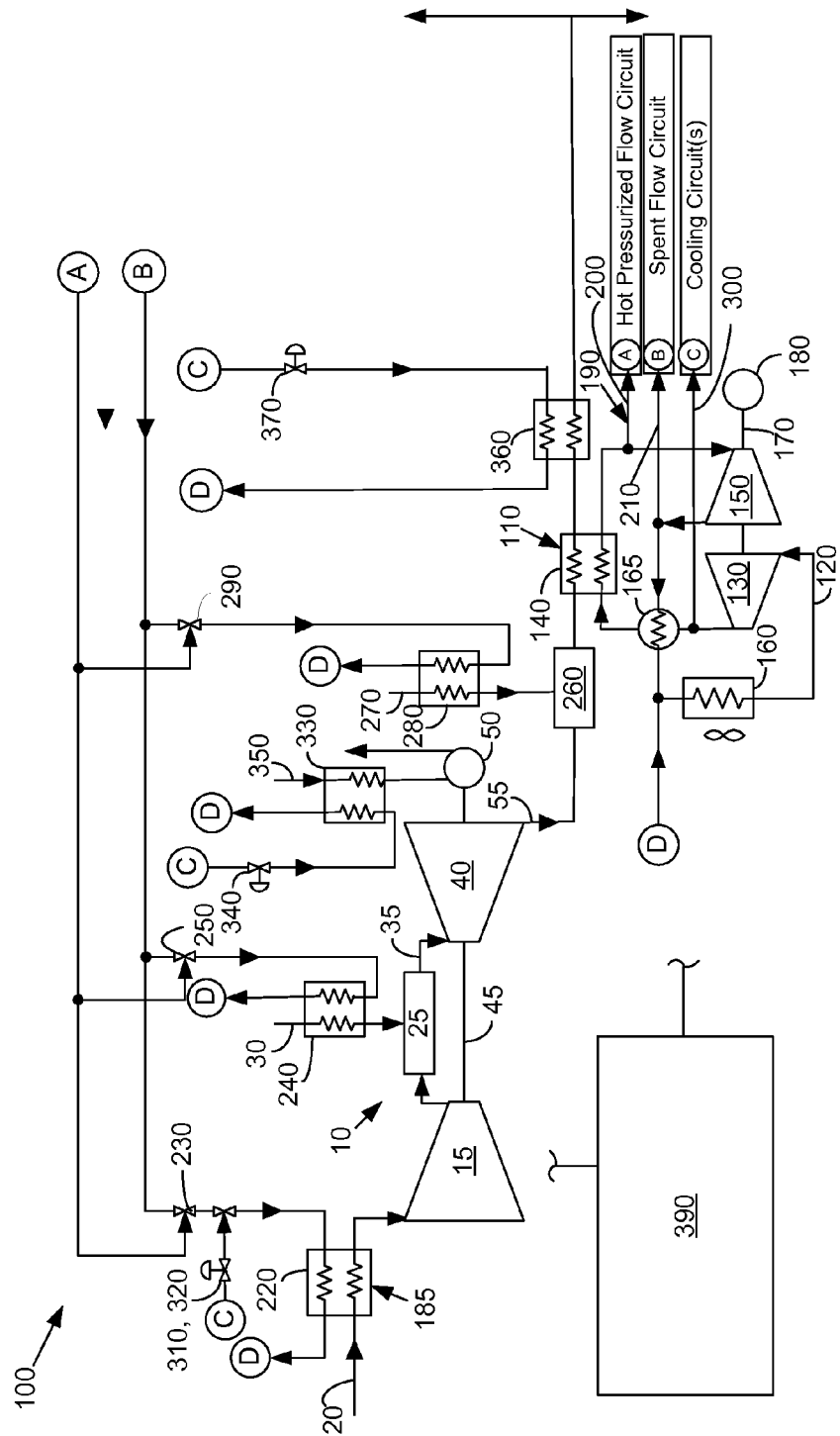
FIG. 2 is a schematic diagraph of a gas turbine engine with an integrated bottoming cycle system as may be described herein.

FIG. 2 shows the use of the gas turbine engine 10 with an integrated bottoming cycle system 100. The integrated bottoming cycle system 100 may be a Rankine cycle system 110. Specifically, the Rankine cycle system 110 may be driven by a flow of supercritical carbon dioxide 120 as the working fluid. Carbon dioxide has the advantage of being non-flammable, non-corrosive, and able to withstand high cycle temperatures. Likewise, supercritical carbon dioxide generally has high thermal efficiency. Other types of working fluids may be used herein. A Brayton cycle system and the like also may be used.

The Rankine cycle system 110 of the integrated bottoming cycle system 100 may include a carbon dioxide compressor/pump 130, a bottoming cycle heat exchanger 140, a turbo-expander 150, and a cooler/condenser 160. A recuperator 165 also may be used to pre-heat the carbon dioxide 120 before the heat exchanger 140 and to pre-cool the carbon dioxide 120 before the cooler/condenser 160. The bottoming cycle heat exchanger 140 may be in communication with the flow of exhaust gases 55 from the turbine 40. The turbo-expander 150 may be a radial inflow and/or an axial turbo-expander and the like. The flow of supercritical carbon dioxide 120 may be compressed/pressurized in the carbon dioxide compressor/pump 130, gain heat in the bottoming cycle heat exchanger 140 with the flow of the exhaust gases 55, and may be expanded within the turbo-expander 150. The turbo-expander 150 may drive an expander shaft 170. The expander shaft 170 may drive a load 180 such as an additional generator and the like. Although a stand-alone turbo-expander and generator are shown, the load 50 also may be used as a single generator. Such a generator may be oversized and may be driven on one end by the turbine 40 and at the other end by the turbo-expander 150 with intermediate gears and clutches to disengage the turbo-expander 150 when not in operation. Other components and other configurations also may be used herein.

The Rankine cycle system 110 may be in communication with a number of different turbine components 185. The Rankine cycle system 110 may be in communication with the turbine components 185 via a number of heating circuits 190. The heating circuits 190 may include a hot pressurized flow circuit 200. The hot pressurized flow circuit 200 may extend downstream of the bottoming cycle heat exchanger 140 and upstream of the turbo-expander 150 for a hot and pressurized flow. The heating circuits 190 also may include a spent flow circuit 210. The spent flow circuit 210 may extend downstream of the turbo-expander 150. The supercritical carbon dioxide 120 in the spent flow circuit 210 may have a lower temperature and a lower pressure than the flow in the hot pressurized flow circuit 200 after passing through the turbo-expander 150.

The heating circuits 190 may be in communication with a turbine component 185 such as a compressor inlet heat exchanger 220. The compressor inlet heat exchanger 220 may be positioned about an inlet of the compressor 15. The compressor inlet heat exchanger 220 may heat the incoming flow of air 20 for enhanced partial load operations and the like. For example, at partial load operations when the turbine 40 is not operating on exhaust temperature control, heating the inlet air results in an increase in exhaust temperatures to enhance the output of the Rankine cycle system 110. The compressor inlet heat exchanger 220 also may be used for ice mitigation under cold ambient conditions so as to provide anti-icing inlet air and/or direct heating of the inlet system to prevent ice formation. The temperature and pressure of the flow of supercritical carbon dioxide 120 provided to the compressor inlet heat exchanger 220 may be controlled by a compressor inlet valve 230 in communication with the hot pressurized flow circuit 200 and the spent flow circuit 210. Other components and other configurations may be used herein.

The heating circuits 190 also may be in communication with a turbine component 185 such as a fuel heater 240. The fuel heater 240 may heat the flow of fuel 30 entering the combustor 25. The temperature and pressure of the flow of supercritical carbon dioxide 120 entering the fuel heater 240 may be controlled by a fuel heater valve 250 in communication with the hot pressurized flow circuit 200 and the spent flow circuit 220. Other components and other configurations may be used herein.

The integrated bottoming cycle system 100 also may include a burner 260 positioned upstream of the bottoming cycle heat exchanger 140. The burner 260 may combine the exhaust gases 55 from the turbine 40 with a flow of burner fuel 270. The heating circuits 190 maybe in communication with a burner fuel heater 280 so as to heat the flow of burner fuel 270. The burner 260 thus heats the exhaust gases 55 entering the bottoming cycle heat exchanger 140 during start up such that the Rankine cycle system 110 may begin to produce power. The burner 260 also may be used at full load to increase the output of the Rankine cycle system 110 and the overall system 100. Specifically, providing additional energy to the flow of carbon dioxide 120 may enable performance of the various turbine components 185 while maintaining the output of the Rankine cycle system 110. The temperature and pressure of the flow of supercritical carbon dioxide 120 entering the burner fuel heater 280 may be varied by a burner fuel heater valve 290 in communication with the hot pressurized flow circuit 200 and the spent flow circuit 210. The fuel heaters 240, 280 may be separate components as is shown or may they may be combined as a single component. The fuel heaters 240, 280 may accommodate different types of fuels. Moreover, lower quality fuels may be used. Other components and other configurations also may be used herein.

The integrated bottoming cycle system 100 also may include one or more cooling circuits 300 in communication with the turbine components 185. The cooling circuits 300 may extend downstream of the carbon dioxide compressor/pump 130. For example, the cooling circuits 300 may be in communication with the compressor inlet heat exchanger 220. The cooling circuits 300 may be in communication with the compressor inlet heat exchanger 220 via a compressor inlet expansion valve 310. The compressor inlet expansion valve 310 may be a Joule-Thomson valve 320. The Joule-Thomson valve 320 serves to lower the temperature and the pressure of the flow of supercritical carbon dioxide 120 in the cooling circuits 300. The cooling circuits 300 thus cools the inlet air flow 20 about the compressor 15 to enhance gas turbine power output by enabling increased fuel consumption. The compressor inlet heat exchanger 220 may be the same as used with the heating circuits 190 or a separate unit. Other components and other configurations may be used herein.

The cooling circuits 300 also may be in communication with a turbine component 185 such as one or more electrical/electronics cooling heat exchangers 330. The electrical/electronics cooling heat exchangers 330 may cool various electrical/electronics components such as the load 50 in the form of a generator and/or any of the other electronics and control systems used herein. The cooling circuits 300 may be in communication with the electrical/electronics cooling exchanger 330 via an electrical/electronics expansion valve 340. Similar to that described above, the electrical/electronics expansion valve 340 may be a Joule-Thomson valve 320 to cool the flow of supercritical carbon dioxide 120. Specifically, the electrical/electronics cooling heat exchanger 330 may cool an electrical/electronics airflow 350 via the flow of supercritical carbon dioxide from the cooling circuits 300. Other components and other configurations may be used herein.

The cooling circuits 300 also may be in communication with a turbine component 185 such as condensing heat exchanger 360. The condensing heat exchanger 360 may be downstream of the bottoming cycle heat exchanger 140. The condensing heat exchanger 360 may cool the flow of exhaust gases 55 so as to extract water therefrom. The condensing heat exchanger 360 may be made of substantially corrosion resistant materials. The cooling circuits 300 may be in communication with the condensing heat exchanger 360 via a condenser expansion valve 370. The condenser expansion valve 370 may be a Joule-Thomson valve 320 and the like so as to cool the flow of supercritical carbon dioxide 120. Other components and other configurations may be used herein.

Overall operation of the integrated bottoming cycle system 100 may be controlled by a bottoming cycle controller 390.

The bottoming cycle controller 390 may be any type of programmable logic device. The bottoming cycle controller 390 may be in communication with the overall controller of the gas turbine engine 10 and the like. The bottoming cycle controller 390 may be a rules based controller that diverts the flow of supercritical carbon dioxide 120 from the turbo-expander 150 as long as (1) the economics of the heating/cooling demands are improved, (2) and/or that additional output is needed, and (3) that the incremental reduction in power output from the turbo-expander 150 as a result of the diversion is less than the increase in overall gas turbine output (unless the bottoming cycle controller 390 directs the use of the duct burner 260 to increase the thermal content of the flow of supercritical carbon dioxide 120 by increasing the temperature). The bottoming cycle controller 390 integrates the performance of all of the equipment configurations and operational parameters for efficient and economical use of the waste heat. Other types of rules and operational parameters may be used herein. The integrated bottoming cycle system 100 thus utilizes the flow of exhaust gases 55 to provide increased power output as well as different types of heating and/or cooling via the rules based controller 390.

In use, the flow of exhaust gases 55 produced by the turbine 40 drives the Rankine cycle system 110 via the bottoming cycle heat exchanger 140. The Rankine cycle system 110 thus may provide additional power output via the turbo-expander 150 driving the load 180. Alternatively, the integrated bottoming cycle system 100 may divert part of the flow of supercritical carbon dioxide 120 to the heating circuits 190 for inlet air heating, fuel heating, and the like. Alternatively, part of the flow of supercritical carbon dioxide 120 may be diverted to the cooling circuits 300 so as to cool the inlet air, cool the electronics used herein, condense water in the flow of exhaust gases 55, and the like. The cooling circuits 300 may use the Joule-Thomson valves 320 so as to cool the flow of supercritical carbon dioxide 120.

Solar and/or geothermal heating of the flow of supercritical carbon dioxide 120 also may be incorporated herein. Other types of heating and/or cooling also may be performed herein.

The overall integration of the Rankine cycle system 110 and the turbine components 185 herein provides a more cost effective approach in maximizing output as compared to separate bottoming cycle systems and heating and/or chilling systems. The rules based controller 390 may optimize the various heating and cooling flows for any given set of ambient conditions, load demands, fuel costs, water costs, and overall equipment configurations and operational parameters for efficient and economical use of the waste heat produced herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An integrated bottoming cycle system for use with a gas turbine engine, comprising:
    a compressor/pump configured to compress/pump carbon dioxide;
    a bottoming cycle heat exchanger configured to receive exhaust gas from the gas turbine engine and carbon dioxide from the compressor/pump, wherein the carbon dioxide is heated by the exhaust gas;
    a cooling circuit configured to receive carbon dioxide from the compressor/pump, the cooling circuit positioned between the compressor/pump and the bottoming cycle heat exchanger;
    a heating circuit configured to receive carbon dioxide from the bottoming cycle heat exchanger and to deliver carbon dioxide to the gas turbine engine, the heating circuit comprising a hot pressurized flow circuit for de-icing an inlet of a gas turbine compressor/pump of the gas turbine engine, for heating a flow of air at the inlet of the gas turbine compressor/pump, and for improved efficiency under part load conditions;
    a turbo-expander in communication with the bottoming cycle heat exchanger, the turbo-expander configured to expand carbon dioxide received from the bottoming cycle heat exchanger, wherein the turbo-expander is positioned downstream of the heating circuit;
    a spent flow circuit configured to receive carbon dioxide from the turbo-expander;
    a fuel heater in communication with the hot pressurized flow circuit, the fuel heater configured to heat fuel entering a combustor of the gas turbine engine using carbon dioxide received from the hot pressurized flow circuit; and
    a fuel heater valve positioned upstream of the fuel heater and configured to control a temperature and pressure of carbon dioxide entering the fuel heater.

2. The integrated bottoming cycle system of claim 1, wherein the bottoming cycle heat exchanger comprises a Rankine cycle system.

3. The integrated bottoming cycle system of claim 1, further comprising a flow of supercritical carbon dioxide.

4. The integrated bottoming cycle system of claim 1, further comprising a burner upstream of the bottoming cycle heat exchanger and downstream of a gas turbine combustor for fast start up and increased output, the burner configured to heat the exhaust gas entering the bottoming cycle heat exchanger.

5. The integrated bottoming cycle system of claim 1, wherein the fuel heater comprises a burner fuel heater.

6. The integrated bottoming cycle system of claim 1, wherein the cooling circuit comprises one or more expansion or Joule-Thomson valves thereon.

7. The integrated bottoming cycle system of claim 1, further comprising an electrical/electronics heat exchanger.

8. The integrated bottoming cycle system of claim 1, further comprising a condensing heat exchanger.

9. The integrated bottoming cycle system of claim 1, further comprising a recuperator upstream of the bottoming cycle heat exchanger.

10. The integrated bottoming cycle system of claim 1, further comprising a rule-based control system.

11. The integrated bottoming cycle system of claim 1, wherein the hot pressurized flow circuit is upstream of the turbo-expander.

12. An integrated bottoming cycle system for use with a gas turbine engine, comprising:
    a carbon dioxide compressor/pump for compressing/pumping a flow of supercritical carbon dioxide;
    a bottoming cycle heat exchanger for exchanging heat with the gas turbine engine, the bottoming cycle heat exchanger configured to receive exhaust gas from the gas turbine engine and supercritical carbon dioxide from the compressor/pump, wherein the supercritical carbon dioxide is heated by the exhaust gas;
    a cooling circuit configured to receive supercritical carbon dioxide from the compressor/pump, the cooling circuit positioned between the carbon dioxide compressor/pump and the bottoming cycle heat exchanger;

a heating circuit configured to receive supercritical carbon dioxide from the bottoming cycle heat exchanger and to deliver carbon dioxide to the gas turbine engine, the heating circuit comprising a hot pressurized flow circuit for de-icing an inlet of a gas turbine compressor of the gas turbine engine, for heating a flow of air at the inlet of the gas turbine compressor, and for improved efficiency under part load conditions;

a turbo-expander in communication with the bottoming cycle heat exchanger, the turbo-expander configured to expand supercritical carbon dioxide received from the bottoming cycle heat exchanger, wherein the turbo-expander is positioned downstream of the heating circuit;

a spent flow circuit configured to receive supercritical carbon dioxide from the turbo-expander;

a fuel heater in communication with the hot pressurized flow circuit, the fuel heater configured to heat fuel entering a combustor of the gas turbine using supercritical carbon dioxide received from the hot pressurized flow circuit; and a fuel heater valve positioned upstream of the fuel heater and configured to control a temperature and pressure of supercritical carbon dioxide entering the fuel heater.

13. The integrated bottoming cycle system of claim 12, wherein the spent circuit is a heating or cooling flow.

14. The integrated bottoming cycle system of claim 12, wherein the cooling circuit comprises one or more expansion or Joule-Thomson valves thereon.

15. The integrated bottoming cycle system of claim 14, further comprising a rule-based control system.

\* \* \* \* \*